United States Patent

Grivas

[11] 3,821,389
[45] June 28, 1974

[54] MICROBIOCIDAL USE OF 1,2-BENZISOTHIAZOLIN-3-ONES

[75] Inventor: John C. Grivas, Holland, Ill.

[73] Assignee: The Sherwin Williams Company, Cleveland, Ohio

[22] Filed: Nov. 15, 1971

[21] Appl. No.: 199,007

Related U.S. Application Data

[63] Continuation-in-part of Ser. No. 873,071, Oct. 31, 1969, abandoned.

[52] U.S. Cl............................. 424/270, 106/15 AF
[51] Int. Cl........................... A01n 9/12, A01n 9/20
[58] Field of Search............... 424/270; 260/304; 106/15 AF

[56] References Cited
UNITED STATES PATENTS

| 3,012,039 | 12/1961 | Morley | 424/270 |
| 3,065,123 | 11/1962 | Hinton et al. | 424/270 |
| 3,517,022 | 6/1970 | Miller et al. | 424/270 |

FOREIGN PATENTS OR APPLICATIONS

| 848,130 | 9/1960 | Great Britain | 424/270 |
| 861,379 | 2/1961 | Great Britain | 424/270 |

*Primary Examiner*—Albert T. Meyers
*Assistant Examiner*—D. W. Robinson

[57] ABSTRACT

Certain 2-(ω-substituted alkyl)-1,2-benzisothiazolin-3-ones, are useful as fungicides and may be used to protect exterior paint surfaces from mildew attack by incorporation in the paint composition.

21 Claims, No Drawings

MICROBIOCIDAL USE OF 1,2-BENZISOTHIAZOLIN-3-ONES

REFERENCE TO COPENDING APPLICATION

This application is a continuation-in-part of U.S. Pat. application Ser. No. 873,071, filed October 31, 1969, now abandoned.

BACKGROUND OF THE INVENTION

Mildew attack has been a continuing problem in numerous environments where the conditions of humidity and temperature are conductive to the growth of various microbial life. Most climates provide sufficient environment for growth of fungi on organic nutrient surfaces, such as plants, fibers, and coatings. One area which has received great attention is the preventing of mildew fungus growth on exterior organic coatings, especially outside building paints. These paints are applied for protective and decorative purposes over various substrates, usually wood, metal, concrete or ceramics. Painting and repainting of wood structures in houses and other buildings consumes manpower and materials in great amounts. The blemishing and deteriorating effects of various fungi on exterior coatings result in enormous maintenance problems. Because most paints are applied by brushing or spraying a liquid coating composition onto the surface, the most common method of preventing mildew is to include in the liquid a fungicidally effective amount of chemicals which kill the fungi responsible for the mildew growth.

Numerous attempts have been made to increase the resistance of exterior coatings to mildew fungi. Inorganic compounds such as zinc oxide or leaded zinc oxide are useful for retarding mildew growth, but these components detract from moisture resistance of the film. One approach to the problem has been the controlled chalking of the film by addition of anatase titanium dioxide pigment; however, this caused more rapid erosion of the coating during weathering.

Because moisture is important to mildew growth, the chemical nature of the organic coating film is significant. Many hydrophobic coatings, such as silicones, vinyls, olefins, etc., are not susceptible to mildew growth because of this. Such hydrophobic films are usually cured by heating, and are not adapted to maintenance coatings. Most air-drying paints do contain hydrophilic groups, such as carboxyl, hydroxyl, ether or amine. These paints include the more common alkyl solvent-type, water-emulsified latex, and drying oil types.

Mildew growth on exterior organic coatings is attributed to several fungi. The relative importance of different species of fungi is climatically dependent; but, *Pullularia* species usually account for the major number of fungus colonies on painted surfaces in the United States. In warm, moist climates such as the Gulf areas around the 30th parallel, Pullularia species account for about 75% to over 90% of mildew growth. North of the 40th parallel this species amounts to more than half the growth. In the warmer moist areas, *Alternaria* species, *Cladosporium* species, and *Penicillium* species are secondary causes of discoloration. In the northern climates *Aspergillus* species also is a secondary mildew fungus.

A number of other micro-organisms, such as *Rhodotorula* (yeast), *Monilia*, *Mucor* and *Botrytis*, are minor causes of mildew. An organic surface that is a nutrient for some fungi may not be a nutrient for others. Generally, a nutrient for other fungi will also support *Pullularia* growth. *Alternaria* occurrence is higher in latex paints, whereas *Cladosporium* does not thrive on a typical latex film. *Rhodotorula* is associated mostly with drying oil paint vehicles and areas protected from weathering (e.g., under eaves).

The preferred method for controlling mildew growth on exterior coatings is to incorporate antifungal compositions into the liquid coating material before application to the substrate. In order to achieve uniform distribution of the antifungal additives, the mixing should be performed as an industrial operation, rather than adding the fungicide in the field. For this reason chemical compatibility of the fungicide with the liquid material is important. Many fungicides lose their fungicidal activity prior to being applied in a film. This is particularly significant in latex liquid paints, which are usually alkaline. Thus, container storage life is an important criterion for selecting a paint fungicide. While small amounts of biologically active compounds may prevent deterioration of film-forming materials by anaerobic micro-organisms in a sealed can, the most important function of paint fungicides is the prevention of mildew on a nutrient surface exposed to ambient air. The weathering environment to which most exterior coatings are exposed proves to be detrimental to the biological activity of many chemical compounds.

Other chemical and physical properties to be considered for fungicide additives include animal toxicity, color, solubility (especially in water), film permeability, volatility and odor. Mercury compounds, such as phenyl mercuric phthalate, are effective against some fungi, but harmful to humans and do not prove dependable under field conditions. Dark materials, such as cuprous oxide, cannot be used in light-colored films. Many sulfur-containing compounds, for instance mercaptans, give an unpleasant or noxious odor to the coatings. Nitrogenous compounds often interfere with drying properties of oil paints. If a fungicide is too water soluble, it may be leached from the film by condensed moisture or precipitation. If the fungicide does not migrate through the coating film, it may remain buried below the paint surface and be ineffective. The mere fact that a chemical compound is known for its activity against fungi does not mean that it will be successful for inhibiting fungal growth on exterior surfaces for long periods of time.

Several organic compounds have gained acceptance as exterior paint fungicides. Captan (N-trichloromethylmercapto-4-cyclohexene-1,2-carboximide) has been used for this purpose, and is effective against *Pullularia* and other fungi. Trans-1,2-bis (n-propylsulfonyl) ethylene (U.S. Pat. No. 3,199,990) is highly effective in alkyd and oil paints. 2,3,5,6-Tetrachloro-4-(methyl-sulfonyl) pyridine is used in many latex paints as fungicide.

Deterioration and discoloration of exterior films by microbial growth are discussed by Rothwell in the F.P.V.P.C. *Official Digest*, April, 1958, pp. 368–376. Several fungi, yeast and bacteria species are known to cause mildew growth on exterior paints, but Pullularia has been reported as the major cause in over 95% of reported cases.

BRIEF SUMMARY OF THE INVENTION

A high degree of growth inhibition against fungi has been discovered for 2-(ω-substituted alkyl)-1,2-benzisothiazolin-3-ones, especially against those fungal species found to cause paint mildew problems. These compounds have the following chemical structure:

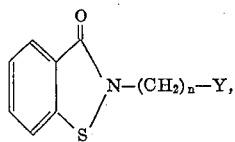

where n is 1 or 2 and Y is selected from the group consisting of halogen, -CN, -SCN, $$-CO-\bigcirc,\ -O\overset{O}{\underset{O}{S}}-\bigcirc-CH_3$$

and $-CH(OCH_3)_2$.

Superior antifungal performance is achieved using at least one of these benzisothiazolinones to protect outside house paint under conditions of high humidity and temperature. About 1% of the compound incorporated in a liquid coating composition is sufficient to obtain mildew resistance.

DESCRIPTION OF THE PREFERRED EMBODIMENTS

The following examples are given as representative of the invention, but the inventive concept is not limited to such examples. Units are expressed as parts by weight unless otherwise stated.

EXAMPLE 1:
2-(2-CHLOROETHYL)-1,2-BENZISOTHIAZOLIN-3-ONE

A solution of 178 parts (1.5 mols) thionyl chloride in 1,500 parts chloroform is added incrementally with stirring to 284 parts (1.4 mols) 2-(2-hydroxyethyl-1,2-benzisothiazolin-3-one) kept 60°–65° C.

The solution is then refluxed for 1½ hours, and the solvent evaporated to dryness to yield crude product in the form of an oil which solidified upon standing. The crude product is purified by recrystallizations from acetone and, finally, from ethanol to yield pure 2-(2-chloroethyl)-1,2-benzisothiazolin-3-one, m.p. 94.5°–95.5°C.

Analysis:

Calculated for $C_9H_8ClNOS$: C, 50.59; H, 3.77; Cl, 16.59; N, 6.56; S, 15.01
Found: C, 50.55; H, 3.86; Cl, 16.53; N, 6.79; S, 15.44

EXAMPLE 2:
2-(2-iodoethyl)-1,2-BENZIOSOTHIAZOLIN-3-ONE

A mixture of 106 parts 2-(2-chloroethyl-1,2-benzisothiazolin-3-one (0.5 mol) was prepared in Example 1, and 89 parts sodium iodide (0.6 mol) is refluxed in acetone with stirring for about 24 hours. The precipitated sodium chloride is filtered off, and the filtrate cooled to yield 96 parts of crude product. Two crystallizations Analysis:

Calculated for $C_9H_8INOS$: C, 35.43; H, 2.64; N, 4.59; S, 10.51; I, 41.59
Found: C, 35.51; H, 2.55; N, 4.72; S, 10.59; I, 41.56 from acetone gives 72 parts the pure compound: m.p. 122.5°–123.5° C.

EXAMPLE 3:
2-CYANOMETHYL-1,2-BENZISOTHIAZOLIN-3-ONE

Through a suspension of 220 parts 2,2'-dithiodibenzoyl chloride (0.64 mol) in about 1,040 parts of carbon tetrachloride at 25°–30° C., dry chlorine is bubbled until practically no solid is left in suspension. The solution of o-chlorothiobenzoyl chloride obtained is then clarified by gravity filtration and added incrementally with cooling to a stirred solution of 10.1 parts freshly prepared aminoacetonitrile (0.18 mol) in about 320 parts of pyridine at ambient temperature. The reaction mixture is stirred at ambient temperature for about 2 hours, filtered, washed with cold water, and refiltered. The carbon tetrachloride layer is then separated and evaporated to dryness under reduced pressure to yield 68 parts of crude product, m.p. 140°–143.5° C. Further purification by crystallization from a ben- Analysis:

Calculated for $C_9H_6N_2OS$: C, 56.82; H, 3.17; N, 14.72; S, 16.85
Found: C, 56.94; H, 3.28; N, 14.52; S, 16.74 zene/hexane mixture and from benzene gives the pure compound, m.p. 143°–145° C.

EXAMPLE 4:
2-PHENACYL-1,2!BENZISOTHIAZOLIN-3-ONE

A solution of 89 parts o-chlorothiobenzoyl chloride (0.43 mol) prepared as in Example 3 is added simultaneously with 10 parts sodium hydroxide (0.47 mol) in 50 parts water to a stirred solution of 80 parts aminoacetophenone hydrochloride (0.47 mol) in 1,000 parts water at temperature maintained below about 10° C. The precipitated solid is purified by crystallization from benzene to yield 52 parts of product, m.p. 156°–158° C.

Analysis:

Calculated for $C_{15}H_{11}NO_2S$: C, 66.89; H, 4.12; N, 5.20; S, 11.90
Found: C, 66.91; H, 4.29; N, 5.14; S, 12.13

EXAMPLE 5:
2-(2-CYANOETHYL)-1,2-BENZISOTHIAZOLIN-3-ONE

A mixture of 107 parts 2-(2-chloroethyl)-1,2-benzisothiazolin-3-one (0.5 mol), 49 parts sodium cyanide (1.0 mol), and 15 parts sodium iodide (0.01 mol) in about 1,600 parts acetone is refluxed for about 16 hours and filtered hot. The filtrate is cooled to precipitate 58 parts of product, which is purified by recrystallization from acetone, m.p. 158°–159° C.

Analysis:

Calculated for $C_{10}H_8N_2OS$: C, 58.80; H, 3.95; N, 13.72; S, 15.70
Found: C, 58.83; H, 3.96; N, 13.76; S, 15.60

EXAMPLE 6:
2-(2-HYDROXYETHYL)-1,2-BENZISOTHIAZOLIN-3-ONE P-TOLUENESULFONATE ESTER

To a solution of 195 parts 2-(2-hydroxyethyl)-1,2-benzisothiazolin-3-one (1.0 mol) in about 360 parts pyridine is added incrementally with stirring at ambient temperature 210 parts of solid p-toluenesulfonyl chloride (1.1 mol). The reaction mixture is stirred at 20° C. for 3 hours, diluted with about 2,600 parts of dilute (about 8%) hydrochloric acid, and the precipitated solid is filtered off to yield 370 parts of crude product. This is purified by two recrystallizations from acetone to yield 254 parts of pure product. The analytical sample is recrystallized again from acetone, m.p. 147.5°–148° C.

Analysis:

Calculated for $C_{16}H_{15}NO_4S_2$: C, 55.00; H, 4.33; N, 4.01; S, 18.35
Found: C, 54.84; H, 4.38; N, 3.96; S, 18.47

EXAMPLE 7:
2-(2-THIOCYANOETHYL)-1,2-BENZISOTHIAZOLIN-3-ONE

A mixture of 166 parts 2-(2-hydroxyethyl)-1,2-benzisothiazolin-3-one p-toluenesulfonate ester (0.47 mol) as prepared in Example 6 and 52 parts potassium thiocyanate (0.53 mol) in about 400 parts ethanol is refluxed for 6 hours and evaporated in vacuo to dryness. The solid is washed 3 times in 1,000 parts water, filtered off and dried to yield 98 parts crude product. The compound is purified by crystallization from acetone/hexane mixture, m.p. 102°–103° C.

Analysis:

Calculated for $C_{10}H_8N_2OS_2$: C, 50.82; H, 3.41; N, 11.86; S, 27.14
Found: C, 50.62; H, 3.37; N, 11.74; S, 26.93

Dry chlorine is bubbled through a suspension of 343 parts 2,2'-dithiodibenzoyl chloride (1.0 mol) in 1,600 parts carbon tetrachloride at room temperature until a clear solution is obtained. Excess chlorine is removed under vacuum at 25°–30° C. The filtered solution is added incrementally to a vigorously agitated solution of 205 parts aminoacetaldehyde dimethyl acetal (1.95 mol, $H_2N-CH_2-CH(OCH_3)_2$) in 980 parts pyridine while maintaining the reaction temperature at 25°–30° C. with cooling. The mixture is allowed to stand overnight and then is poured into about 2,000 parts of ice-water. The carbon tetrachloride phase is separated from the aqueous phase, which is washed twice with 4,000 parts carbon tetrachloride. The washings are combined with the organic phase and dried over anhydrous calcium sulfate. After evaporation under vacuum 269 parts of crude syrup are obtained. The crude is crystallized from hexane to yield 220 parts of pale yellow crystalline compound, m.p. 53.5°–55.5° C.

The assigned structures are confirmed by infrared and nuclear magnetic resonance studies.

MICROBIOLOGICAL ACTIVITIES--SERIAL DILUTION TESTS

The intrinsic fungicidal activity of the substituted-alkyl benzisothiazolinones compounds were investigated to determine the minimum inhibitory concentration in vitro against *Pullularia pullulans* (P.p.) and *Penicillium oxalium* (P.o.). The samples were dissolved in a small quantity of organic solvent and made to volume with sterile Sabouraud Liquid Medium. The samples were made to various concentrations in the nutrient medium by the serial dilution technique. These were inoculated with P.p. or P.o. fungi species and incubated for seven days at 25° C. The results showed a minimum concentration against *Pullularia* species to be from about 1 to 500 parts per million for the various compounds tested. These inhibitory amounts compare favorably with commercially available paint fungicides.

In Table I the results of the serial dilution tests are set forth for the compounds described in Examples 1 to 8.

EXAMPLE 8:
2-(2,2-DIMETHOXYETHYL)-1,2-BENZISOTHIAZOLIN-3-ONE

TABLE I

| Example No. | Substituent Radical | Serial Dilution Minimum Inhibitory P.p. | Concentration P.o. |
|---|---|---|---|
| 1 | 2-chloroethyl | 2 | 2 |
| 2 | 2-iodoethyl | 1 | — |
| 3 | cyanomethyl | 64 | — |
| 4 | phenacyl | 128 | — |
| 5 | cyanoethyl | 500 | — |
| 6 | hydroxyethyl toluenesulfonate ester | 500 | — |
| 7 | thiocyanoethyl | 16 | — |
| 8 | 2,2-dimethoxyethyl | 16 | 1 |
| captan control | | 8 | — |

AGAR PLATE TESTS

A standard laboratory test used to evaluate fungicidal properties of compounds is the agar plate test, performed according to U.S.D.A. Circular No. 198 (1931- ). A Difco potato dextrose agar plate was selected as the organic nutrient surface. The 2-chloroethyl derivative (Example 1) was dissolved in an organic solvent as solute in concentrations of 1% to 0.01% by weight, and the solution was applied uniformly over the surface of sterile filter pads (½ inch diameter). After evaporation of the carrier liquid, the pads were placed on the agar plates. Both pads and plates were inoculated with a spore suspension of the test fungi, *Pullularia pullulans* (P.p.), *Cladosporium sphaerospermum* (C.s.), and *Aspergillus niger* (A.n.). The compound was also compared to a commercially used fungicide, captan. After a period of standard incubation, the pads and agar plates were examined to determine growth (+) of fungus on the pad and to measure the zone width (millimeters) of growth inhibition in the agar plates beyond the periphery of the smaller treated pad. The results are shown in Table II.

TABLE II

| Compound | Conc (Wt. %) | Agar Plate Test P.p. | | C.s. | | A.n. | |
|---|---|---|---|---|---|---|---|
| | | Zone (mm) | Growth (on pad) | Zone (mm) | Growth (on pad) | Zone (mm) | Growth (on pad) |
| 2-(2-Chloroethyl)- 1,2-benzisothia- zolin-3-one (CEB) | 1 | 14 | 0 | 20 | 0 | 13 | 0 |
| | 0.1 | 11 | 0 | 12 | 0 | 9 | 0 |
| | 0.01 | 3 | 0 | 5 | 0 | 1 | 0 |
| Captan | 0.1 | 11 | 0 | 14 | 0 | 10 | 0 |
| | 0.01 | 5 | 0 | 9 | 0 | 4 | 0 |
| Control | 0 | 0 | | 0 | | 0 | |

ACCELERATED PAINT TEST

A severe test to evaluate fungicides for paints is the accelerated weathering test, which is helpful in anticipating field performance (P.A. Wolf et al, Amer. Chem. Soc. Div. of Coatings and Plastics, 25, 23 (1965- )). This method was used to test and compare several benzisothiazolinones as follows:

A 1% concentration of each of five benzisothiazolinones in alkyd paint was prepared in the same manner. The five compounds were:

2-(Chloroethyl)-1,2-benzisothiazolin-3-one (CEB)
2-Benzyl-1,2-benzisothiazolin-3-one
2-Cyclohexyl-1,2-benzisothiazolin-3-one
2-Allyl-1,2-benzisothiazolin-3-one
2-Methyl-1,2-benzisothiazolin-3-one The alkyd paint contained the following components:

| | |
|---|---|
| soya oil-modified ester of glycerol and phthalic anhydride | 340 parts; |
| linseed oil | 73 parts; |
| chlorinated paraffin resin (Chlorowax) | 91 parts; |
| titanium dioxide pigment | 200 parts; |
| alkaline earth silicate | 100 parts; |
| bentonite gel | 82 parts; |
| metal naphthenate dryers | 9 parts; & |
| mineral spirits | 130 parts. |

The liquid alkyd paint contained about 87 weight % solids.

A negative control containing no benzisothiazolinone and each of the other paints was then applied to wood chips in the same manner, weathered for the same period of time and subjected to mildew attack in a modified tropical chamber. Examination of the samples for fungi growth after 21 days of incubation showed that each paint containing benzisothiazolinone (except CEB) had about the same rating as the negative control, whereas paint containing 2-(2-chloroethyl)-1,2-benzisothiazolin-3-one had a significantly less growth of fungi on the sample.

The above accelerated test procedure was followed at a concentration of 1% by weight, comparing the CEB compound with trans-1,2-bis(n-propylsulfonyl) ethylene ("Vancide PA"), a well-known commercial paint fungicide. Using the alkyd paint formulation above, and weathering pine and redwood wood chips for 100 hours with a 21-day incubation period, it was found that the CEB compound was equal to the commercial fungicide in antifungal protection.

The fungicidal ω-substituted-alkyl benzisothiazolinone compounds may be used with a wide variety of oils, resins, solvents, pigments and coating additives in formulating organic film-forming compositions having mildew resistance. The more common types of exterior coatings for which these compounds are useful as fungicides include the drying oils, alkyds and latex-type paints. The film-forming vehicles include the triglyceride esters of unsaturated fatty acids, such as linseed oil or soya oil; esters of polycarboxylic acids with polyols, such as reaction products of phthalic anhydride with glycerol or pentaerythritol; oil-modified alkyds; modified phenolic resins, such as aldehyde condensation; melamine resins; synthetic elastomeric latexes; homopolymers or copolymers of olefinically unsaturated compounds, including vinyl acetates and acrylic resins; urethane resins; ether resins and numerous other conventional coating vehicles. Typical pigments which can be combined with the film-forming organic binder in exterior paints comprise titanium dioxide, alkaline earth carbonates and silicates, bentonite, mica, metal oxides, carbon, etc. Solvents and co-solvents are used conventionally in both organic-thinned or water thinned coating compositions, for instance, mineral spirits, polyols, benzenoids, etc. Numerous additives can be incorporated in the antifungal paints for suppressing foam, for plasticizing the dried films, for emulsifying latexes, or for accelerating the film cure.

While the antifungal additive is usually incorporated directly into a coating to be applied as a top coat, some organic coatings can be adequately protected by using the antifungal additive in a primer or intermediate coat. Migration into an adjacent layer from a substrate containing a fungicide can be an effective means for controlling mildew in some applications. A relatively higher local concentration of fungicidal agent may be necessary under such conditions. Direct application of the fungicide with an inert carrier over the organic nutrient surface may be used to protect against fungus growth, but this method may not be desirable for exterior weathered surfaces due to erosion. Some interior surfaces in food processing rooms, such as bakeries, breweries, meat packing plants, etc., also suffer from mildew growth due to extreme conditions of humidity or temperature. Here the weathering effect is not such an important factor, but the use of a fungicide is desirable.

The preferred concentrations of benzisothiazolinones in the dry coating films is from the minimum inhibitory amount to about 2% by weight. Greater amounts may be used, but no particular benefit is gained from using concentrations much higher than the minimum fungicidally effective amount of at least one of these compounds.

While the invention has been described by specific examples, there is no intent to limit the inventive concept except as set forth in the following claims.

I claim:

1. A process for controlling growth of fungi which comprises contacting the fungi with a fungicidally effective amount of at least one compound having the structure:

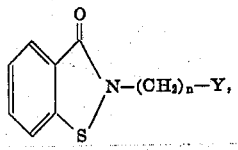

where n is 1 or 2 and where Y is selected from the group consisting of Cl, I,

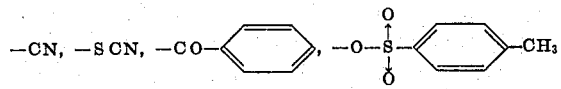

and $CH(OCH_3)_2$.

2. The process of claim 1 wherein n is 1 and Y is -CN.

3. The process of claim 1 wherein n is 2 and Y is -CN.

4. The process of claim 1 wherein n is 2 and Y is Cl.

5. The process of claim 1 wherein n is 1 and Y is

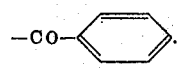

6. The process of claim 1 wherein n is 2 and Y is

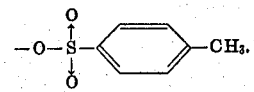

7. The process of claim 1 wherein n is 2 and Y is -SCN.

8. The process of claim 1 wherein n is 1 and Y is -CH(OCH$_3$)$_2$.

9. The process of claim 1 wherein n is 2 and Y is I.

10. A mildew resistant organic coating composition containing a film-forming organic binder and a fungicidally effective amount of at least one compound having the structure:

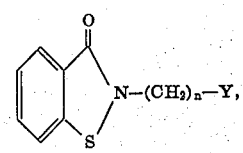

where n is 1 or 2 and where Y is selected from halogen, -CN, -SCN,

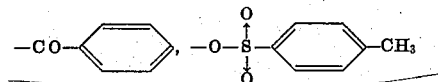

and -CH(OCH$_3$)$_2$.

11. A process for controlling growth of fungi which comprises contacting the fungi with a fungicidally effective amount of a compound having the structure:

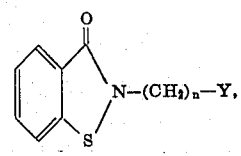

wherein n is 1 or 2 and wherein Y is halogen,

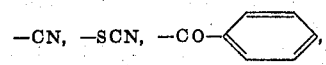

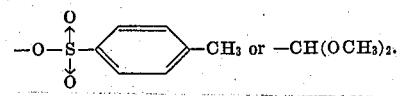

12. A process for controlling growth of fungi which comprises contacting the fungi with a fungicidally effective amount of a chemical material having the structure:

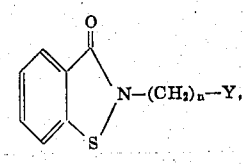

where n is 1 or 2 and where Y is selected from the group consisting of Cl, I, -CN, -SCN,

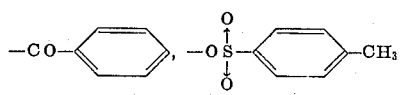

and -CH(OCH$_3$)$_2$.

13. The process of claim 12 wherein n is 1 and Y is -CN.

14. The process of claim 12 wherein n is 2 and Y is -CN.

15. The process of claim 12 wherein n is 2 and Y is Cl.

16. The process of claim 12 wherein n is 1 and Y is

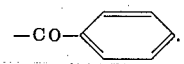

17. The process of claim 12 wherein n is 2 and Y is

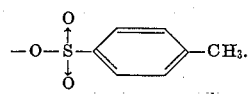

18. The process of claim 12 wherein n is 2 and Y is -SCN.

19. The process of claim 12 wherein n is 1 and Y is -CH(OCH$_3$)$_2$.

20. The process of claim 12 wherein n is 2 and Y is I.

21. A process for controlling growth of fungi on an organic coating containing a film-forming organic binder which comprises contacting the fungi with a fungicidally effective amount of ω-substituted alkyl 1,2-benzisothiazolin-3-one having the structural formula:

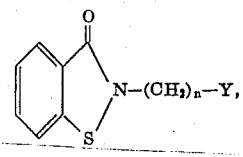

wherein n is 1 or 2, and wherein Y is halogen, -CN, -SCN,

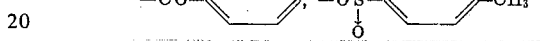

or -CH(OCH$_3$)$_2$, said benziosothiazoline being present in a concentration up to 2% by weight of the coating, dry basis.

* * * * *